United States Patent [19]

Gansloser et al.

[11] Patent Number: 4,698,098

[45] Date of Patent: Oct. 6, 1987

[54] METHOD OF PRODUCING AN ALGAE GROWTH-REPELLENT UNDERWATER COATING AND THE RESULTANT PRODUCT

[75] Inventors: Helmut Gansloser, Constance; Benjamin Nissenbaum, St. Leonhardsweg, D-775 Konstanz, both of Fed. Rep. of Germany

[73] Assignee: Benjamin Nissenbaum, Constance, Fed. Rep. of Germany

[21] Appl. No.: 422,682

[22] Filed: Sep. 24, 1982

[30] Foreign Application Priority Data

Jun. 11, 1982 [DE] Fed. Rep. of Germany ....... 3222089
Aug. 16, 1982 [DE] Fed. Rep. of Germany ....... 3230536

[51] Int. Cl.$^4$ ................................................ C09D 5/14
[52] U.S. Cl. ............................... 106/18.36; 106/15.05; 106/16; 106/18; 106/292; 423/367; 424/129; 424/145
[58] Field of Search ............. 106/15.05, 16, 18, 18.36, 106/292; 424/129, 145, 289; 423/367

[56] References Cited

U.S. PATENT DOCUMENTS 3,427,256  2/1969  Milgrom .......................... 423/367
3,432,406  3/1969  Eastman .......................... 430/90
4,115,130  9/1978  Crump et al. ..................... 106/18

*Primary Examiner*—Robert A. Wax
*Attorney, Agent, or Firm*—Bachman & LaPointe

[57] ABSTRACT

A method of producing an algae growth-repellent underwater coating and the resultant product is to be such that it can be operated and performed without causing environmental pollution.

For that purpose, there is added to an underwater paint or the like, a zinc-bearing additive comprising $(CN)_6$-complex salts of hydrocyanic acid, in particular hexacyano iron(II) acid or hexacyano iron(III) acid. Zinc ferrocyanide and/or zinc ferricyanide is/are added to a colorless underwater paint, as a sole or additional pigment, in particular mixed with potassium ferrocyanide or ferricyanide or yellow soda or yellow calcium.

13 Claims, No Drawings

METHOD OF PRODUCING AN ALGAE GROWTH-REPELLENT UNDERWATER COATING AND THE RESULTANT PRODUCT

BACKGROUND OF THE INVENTION

Algae growth-repellent underwater coatings are known, for the purposes of preserving objects which are exposed to water such as the hulls of boats and the like, in the form of the coatings referred to as anti-fouling paints which, for preventing algae growth from occurring on such objects, have toxic, generally inorganic compounds or color pigments such as lead and mercury compounds. Such pigments pollute the water of seas and rivers due to their being rubbed off.

DESCRIPTION OF THE INVENTION

In consideration of those facts, the aim set by the inventor was that of developing non-toxic algae-growth-repellent underwater paints which however have algae growth-repellent properties equivalent to the known toxic coating agents.

This problem is solved in that there is added to an underwater paint or the like, a zinc-bearing additive comprising $(CN)_6$-complex salts of hydrocyanic acid, in particular hexacyano iron(II) acid or hexacyano iron(III) acid. In this connection, zinc ferrocyanide—and/or zinc ferricyanide—in particular mixed with potassium ferricyanides or ferrocyanides or yellow soda or yellow calcium, are advantageously to be added, as a sole or additional coloring pigment, to a colorless underwater paint. Zinc ferrocyanide and zinc ferricyanide are pigments which are insoluble in water and dilute acids and which are obtained by mixing zinc salts (zinc chloride or zinc sulphate) with yellow potassium ferrocyanide or potassium ferricyanide (K), yellow soda (Na) or yellow calcium (Ca). This then results in the zinc ferro- or zinc ferricyanides,

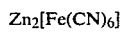

$$Zn_2[Fe(CN)_6]$$

or

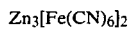

$$Zn_3[Fe(CN)_6]_2$$

which are preferably added in an amount of from 1 to 60% by weight.

EXAMPLE 1

1 kg of clear underwater paint is mixed with 120 g of zinc ferrocyanide on a roller frame unit. After grinding of the components, there is produced an underwater coating which, when mixed with solvents, can be applied by painting.

EXAMPLE 2

1 kg of clear underwater paint is mixed with 80 g of zinc ferrocyanide on the roller frame unit. After grinding of the components, the result is a paint material which, when diluted with solvent, is suitable for use as an algae-repellent underwater coating.

The scope of the invention includes the possibility of combining the non-toxic anti-fouling effect of the two pigments zinc ferrocyanide and zinc ferricyanide, with the incorporation of those coloring agents in/on (OH) containing substances having sorptive properties and/or sorbing inorganic substances, in particular aluminum bearing substances, preferably clay minerals or mixtures thereof such as kaolin or bentonite.

This has the advantage that those end materials are considerably cheaper to produce than the pure pigments, while the algae-repellent effect is retained.

For that purpose, clay, kaolin or bentonite is formed into a slurry in water and a zinc salt (zinc sulphate or zinc chloride) is added to that aqueous suspension. The suspension is stirred repeatedly and left to stand for some hours, thereby providing that, in the interchange as between Na- and Ca-ions, zinc ions are bound to the clay material.

Then, a sufficient amount of potassium ferrocyanide or potassium ferricyanide solution is added to that suspension, thereby causing the insoluble compounds zinc ferrocyanide or zinc ferricyanide to be fixed to the clay minerals. After washing out and drying the clay minerals, and after dewatering, the resulting product are compounds which are suitable and which also have antifouling properties like pure zinc ferrocyanide or zinc ferricyanide.

The method of producing the algae growth-repellent underwater coating is distinguished in that the algae growth-repellent pigments to be used, zinc ferrocyanide or zinc ferricyanide, is effected by precipitation of those salts only after bonding of the zinc cation to a clay mineral, and the resulting clay/clay mineral zinc ferrocyanide or clay/clay mineral zinc ferricyanide is used as a color pigment in the underwater coating paint.

EXAMPLE 3

1 kg of kaolin is put into suspension in water and a 20% zinc chloride solution is added to the aqueous suspension, until zinc ions are no longer absorbed, by ion exchange. The kaolin zinc suspension is mixed with a potassium ferrocyanide solution which is also a 20% solution, whereby the insoluble zinc ferrocyanide is fixed to the kaolin. After washing out and drying the material below the kaolin sinter limit, the resulting product is a pigment which has algae growth-repellent properties and which is combined on the roller frame unit with an underwater coating which is colorless or which is also already pigmented.

EXAMPLE 4

1 kg of clay or bentonite, after being formed into a suspension in water, is mixed with a 20% zinc sulphate solution, whereby Na- and Ca-ions are exchanged for zinc ions. The clay or bentonite suspension respectively, which is now saturated with zinc ions, is then mixed with a 20% potassium ferricyanide solution, whereby the insoluble zinc ferricyanide is formed on the clay or bentonite and fixed thereon. After washing out and drying the material below the clay sinter limit, the result is a pigment which has algae growth-repellent properties and which is combined on the roller frame unit with underwater coating binding agents.

The scope of the invention embraces all coating materials which are produced by means of the above-described method.

Silica gel can also be used as a carrier substance for the additives.

Micronized silica gel, preferred for paint pigment purposes, with a grain size of between 2–10μ in diameter, has an enormously large internal surface area. The internal surface area can be filled with insoluble inorganic salts but also with organic coloring agents. By virtue of introducing chemical substances into the capillaries of the silica particles, the silica particle experiences an increased internal stress, due to the capillary activity, which, in the step of forming the film of a coating, results in the film skin being tightened and smooth. This is important in regard to underwater coatings, because of the reduced flow resistance of the water against the skin of the ship.

This effect can be achieved not only with the same additives as are used for the anti-fouling effect, but also with other inorganic or organic substances.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. A method of producing a paint for use in an aqueous environment for preventing the growth of algae comprising providing an underwater paint and adding to said underwater paint a zinc-bearing additive selected from the group consisting of $(CN)_6$-complex salts of hydrocyanic acid.

2. A method according to claim 1 wherein said $(CN)_6$-complex salts of hydrocyanic acid are selected from the group consisting of hexacyano iron(II) acid or hexacyano iron(III) acid.

3. A method according to claim 1 including the steps of adding said complex salts to said underwater paint in an amount of from 1 to 60% by weight.

4. A method according to claim 2 including the steps of mixing said complex salts with an additive selected from the group consisting of yellow potassium ferrocyanide and potassium ferricyanide.

5. A method according to claim 1 including the steps of adding said complex salts to an inorganic carrier substance prior to adding said complex salts to said underwater paint.

6. A method according to claim 5 wherein said inorganic carrier substance is a porous silica gel which is permeated by said complex salts.

7. A method according to claim 5 wherein said silica gel has a pore size of between 2 to $10\mu$.

8. A method according to claim 5 wherein said inorganic carrier substance is selected from the group consisting of alumina, argillaceous earth or zeolite.

9. A method according to claim 5 wherein said inorganic carrier substance is an aluminum absorbing substance.

10. A method according to claim 5 wherein said inorganic carrier substance is selected from the group consisting of individual clay minerals or mixtures thereof.

11. A method according to claim 10 wherein said clay minerals are selected from the group consisting of kaolin or bentonite.

12. A method according to claim 5 including the steps of producing said complex salts by reacting a zinc ion-containing aqueous suspension of the inorganic carrier substance with a hydrocyanic acid and subsequently washing and drying same.

13. A method according to claim 12 wherein said hydrocyanic acid is selected from the group consisting of potassium ferricyanide or potassium ferrocyanide or mixtures thereof.

* * * * *